(12) United States Patent
Fort et al.

(10) Patent No.: US 11,313,937 B2
(45) Date of Patent: Apr. 26, 2022

(54) SYSTEMS AND METHODS FOR ANGLE OF ARRIVAL ESTIMATION

(71) Applicant: Qorvo US, Inc., Greensboro, NC (US)

(72) Inventors: Andrew Fort, Kessel Lo (BE); Bram Van den Bosch, Schilde (BE)

(73) Assignee: QORVO US, INC., Greensboro, NC (US)

( * ) Notice: Subject to any disclaimer, the term of this patent is extended or adjusted under 35 U.S.C. 154(b) by 598 days.

(21) Appl. No.: 16/220,371

(22) Filed: Dec. 14, 2018

(65) Prior Publication Data
US 2020/0191899 A1 Jun. 18, 2020

(51) Int. Cl.
G01S 3/48 (2006.01)
G01S 3/50 (2006.01)
H04B 7/08 (2006.01)
H04B 17/364 (2015.01)

(52) U.S. Cl.
CPC ........ *G01S 3/48* (2013.01); *G01S 3/50* (2013.01); *H04B 7/086* (2013.01); *H04B 17/364* (2015.01)

(58) Field of Classification Search
CPC ..... G01S 3/46; G01S 3/48; G01S 3/50; H04B 17/364; H04B 7/068
See application file for complete search history.

(56) References Cited

U.S. PATENT DOCUMENTS

| 6,421,010 B1 * | 7/2002 | Chadwick | G01S 3/48 |
| | | | 342/462 |
| 2014/0269389 A1 | 9/2014 | Bukkfejes et al. | |
| 2018/0267131 A1 | 9/2018 | Simileysky | |
| 2019/0140629 A1 | 5/2019 | Van Driest | |

FOREIGN PATENT DOCUMENTS

| JP | 2009244243 A | 10/2009 |
| RU | 2584968 A | 5/2016 |

OTHER PUBLICATIONS

Extended European Search Report for European Patent Application No. 19173739.4, dated Nov. 20, 2019, 9 pages.
Author Unknown, "Bluetooth Core Specification," Version 5.0, Dec. 6, 2016, Bluetooth Sig, 2822 pages.
(Continued)

*Primary Examiner* — Cassi J Galt
(74) *Attorney, Agent, or Firm* — Withrow & Terranova, P.L.L.C.

(57) ABSTRACT

A method for operating a wireless receiver includes receiving wireless signals from a transmitter at a first antenna and a second antenna. The wireless signals include a signal carrier and one or more data symbols modulated onto the signal carrier. The one or more data symbols in the wireless signal are decoded to determine a symbol phase contribution. The phase of the wireless signals at the first antenna and the second antenna during one or more symbol periods is estimated to provide a first set of phase measurements and a second set of phase measurements, respectively. The symbol phase contribution is removed from the first set of phase measurements and the second set of phase measurements to provide a first corrected set of phase measurements and a second corrected set of phase measurements, respectively, which are used to estimate an angle of arrival of the wireless signals.

7 Claims, 10 Drawing Sheets

(56) References Cited

OTHER PUBLICATIONS

Author Unknown, "IEEE Standard for Low-Rate Wireless Personal Area Networks (WPANs)," IEEE Standard 802.15.4, 2015, IEEE Computer Society, 709 pages.

Godara, L.C., "Application of Antenna Arrays to Mobile Communications, Part II: Beam-Forming and Direction-of-Arrival Considerations," Proceedings of the IEEE, vol. 85, Issue 8, Aug. 1997, pp. 1195-1245.

* cited by examiner

| PREAMBLE | SFD | HEADER | KNOWN DATA | REPEATED SYMBOL | CRC |

*FIG. 9*

SYSTEMS AND METHODS FOR ANGLE OF ARRIVAL ESTIMATION

FIELD OF THE DISCLOSURE

The present disclosure relates to systems and methods for estimating angle of arrival of wireless signals, and specifically to systems and methods for estimating angle of arrival of wireless signals that are standard agnostic in that they do not require standardized protocol or signaling schemes specifically designed for angle of arrival estimation.

BACKGROUND

Angle of arrival of wireless signals, as measured at a wireless receiver, indicates a direction from which the wireless signals were transmitted relative to the wireless receiver. Angle of arrival provides information about the spatial relationship between a transmitter and a receiver, and thus shows promise for several wireless applications such as indoor location services, asset tracking, and service discovery. Angle of arrival of wireless signals can be estimated by detecting phase differences between the wireless signals received at different antennas. Conventional angle of arrival estimation requires transmission of agreed-upon proprietary or standardized wireless signals such as a constant tone so that a receiver of the wireless signals can properly estimate the phase differences between the wireless signals as they are received on different antennas. Such an approach is not backward compatible with previous or future generations of wireless systems not having these agreed-upon signaling schemes for angle of arrival estimation. This is hampering the widespread adoption of these promising applications. In light of the above, there is a need for improved systems and methods for angle of arrival estimation.

SUMMARY

In one embodiment, a method for operating a wireless receiver starts with receiving wireless signals from a transmitter at a first antenna and a second antenna. The wireless signals include a signal carrier and one or more data symbols modulated onto the signal carrier. Next, the one or more data symbols in the wireless signals are decoded to determine a symbol phase contribution. The symbol phase contribution is the change in the phase, amplitude, frequency, or any combination of these features of the signal carrier due to the modulation of the one or more data symbols. The one or more data symbols are each modulated onto the signal carrier during a different symbol period. Next, the phase of the wireless signals at the first antenna during one or more symbol periods is estimated to provide a first set of phase measurements. The phase of the wireless signals at the second antenna during one or more symbol periods is also estimated to provide a second set of phase measurements. The symbol phase contribution is removed from both the first set of phase measurements and the second set of phase measurements to provide a first corrected set of phase measurements and a second corrected set of phase measurements. The first corrected set of phase measurements and the second corrected set of phase measurements are then used to estimate an angle of arrival of the wireless signals. By determining the symbol phase contribution and removing it from the first set of phase measurements and the second set of phase measurements, accurate angle of arrival estimation can be performed on any arbitrary data packet, thereby foregoing the need for a specialized agreed-upon or standard-compliant signaling schemes in the transmitter.

In one embodiment, a wireless receiver includes a first antenna and a second antenna, decoder circuitry, phase estimation circuitry, and angle of arrival estimation circuitry. The first antenna and the second antenna are each configured to receive wireless signals from a transmitter, where the wireless signals include a signal carrier and one or more data symbols modulated onto the signal carrier. The decoder circuitry is coupled to the first antenna and the second antenna and is configured to receive at least a portion of the wireless signals from the first antenna and the second antenna and decode the one or more data symbols in the wireless signals to determine a symbol phase contribution. The symbol phase contribution is the change in the phase, amplitude, frequency, or any combination of these features of the signal carrier due to the modulation of the one or more data symbols. The one or more data symbols are each modulated onto the signal carrier during a different symbol period. The phase estimation circuitry is coupled to the first antenna, the second antenna, and the decoder circuitry and configured to estimate a phase of the wireless signals received at the first antenna and the second antenna at one or more symbol periods to provide a first set of phase measurements and a second set of phase measurements, respectively. Further, the phase estimation circuitry is configured to remove the symbol phase contribution from the first set of phase measurements and the second set of phase measurements to provide a first corrected set of phase measurements and a second corrected set of phase measurements, respectively. The angle of arrival estimation circuitry is coupled to the phase estimation circuitry and configured to estimate an angle of arrival of the wireless signals based on the first corrected set of phase measurements and the second corrected set of phase measurements. By determining the symbol phase contribution and removing it from the first set of phase measurements and the second set of phase measurements, accurate angle of arrival estimation can be performed on any arbitrary data packet, thereby foregoing the need for a specialized agreed-upon or standard-compliant signaling scheme in the transmitter.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 9 is a diagram illustrating a data packet for angle of arrival estimation according to one embodiment of the present disclosure.

DETAILED DESCRIPTION

Figure 1:
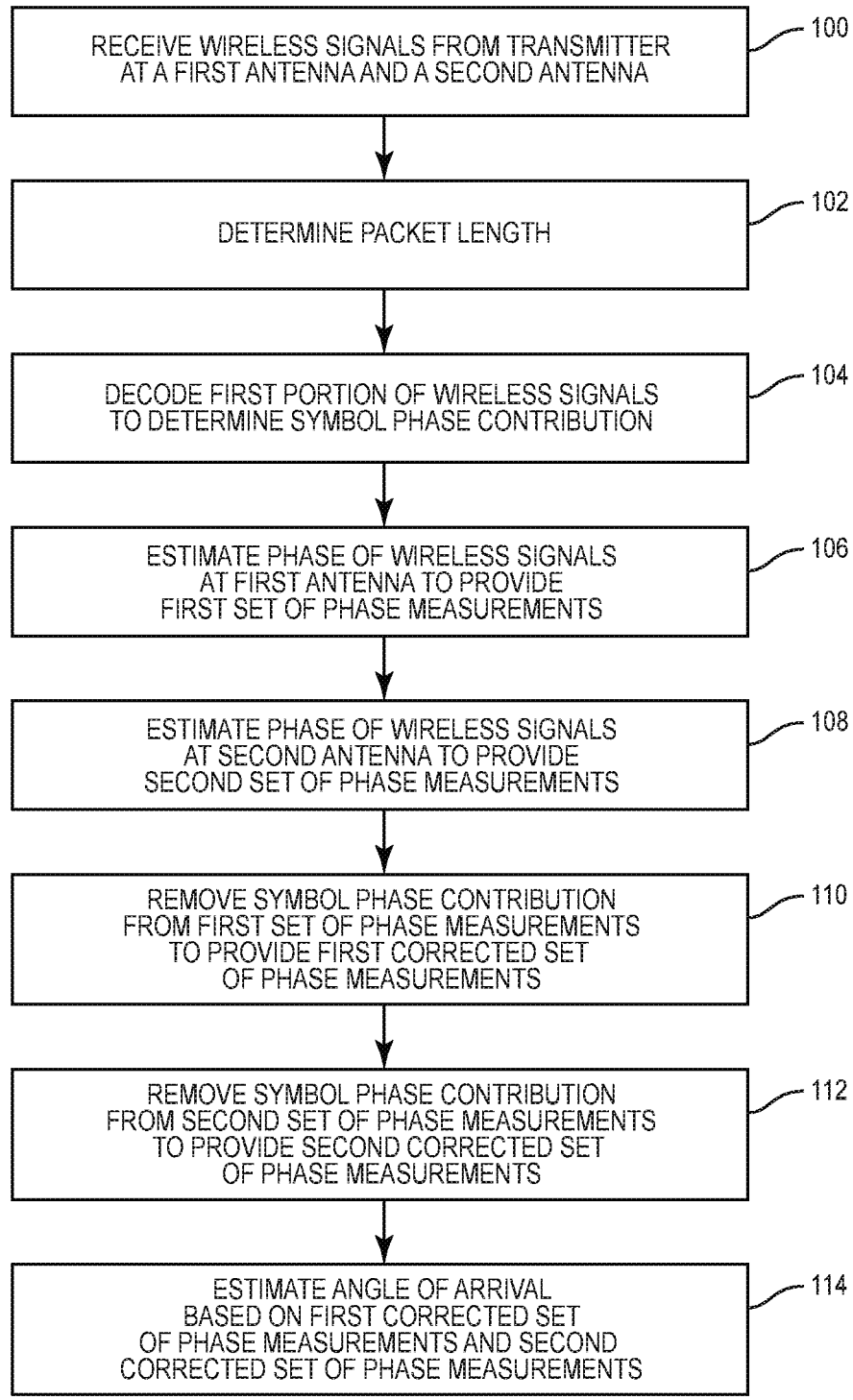
FIG. 1 is a flow diagram illustrating a method for operating a wireless receiver according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 is a flow diagram illustrating a method for estimating angle of arrival of wireless signals according to one embodiment of the present disclosure. First, wireless signals are received at a first antenna and a second antenna (step 100). The wireless signals comprise a signal carrier and one or more data symbols modulated onto the signal carrier. The one or more data symbols may be part of one or more data packets, such that the wireless signals include one or more data packets. Next, a packet length of at least one data packet in the one or more data packets is determined (step 102). Determining the packet length of the at least one data packet may include decoding at least a portion of the data packet. For example, determining the packet length of the at least one data packet may include decoding a header of the data packet, which includes the length of the data packet. As discussed herein, decoding a data packet or a portion thereof includes recovering the data from the data packet or portion thereof. Those skilled in the art will readily appreciate the necessary steps for doing so (i.e., demodulation, analog-to-digital conversion, etc.), and thus these steps are not discussed herein. Next, a portion of the wireless signals including the one or more data symbols is decoded to determine a symbol phase contribution (step 104). Specifically, the wireless signals are decoded at each one of a number of symbol periods including the data symbols as discussed below. As discussed herein, the symbol phase contribution is the change in the phase of the signal carrier due to the modulation of the one or more data symbols onto the signal carrier. To determine the symbol phase contribution, the one or more data symbols must be decoded, which may require the packet length determined above.

Next, the phase of the wireless signals at the first antenna is estimated to provide a first set of phase measurements (step 106). Further, the phase of the wireless signals at the second antenna is estimated to provide a second set of phase measurements (step 108). Notably, each one of the first set of phase measurements and the second set of phase measurements are discrete phase measurements during a symbol period of the data packet and thus include the symbol phase contribution. In other words, and as discussed in detail below, the first set of phase measurements and the second set of phase measurements are generally estimated serially during different ones of the one or more data symbols. Accordingly, phase differences between the first set of phase measurements and the second set of phase measurements are due in part to the spatial relationship between the first antenna and the second antenna and in part to the symbol phase contribution. Angle of arrival estimation requires knowledge of the phase differences between the first set of phase measurements and the second set of phase measurements due only to the spatial relationship between the first antenna and the second antenna. Accordingly, the symbol phase contribution is removed from the first set of phase measurements to provide a first corrected set of phase measurements (step 110) and from the second set of phase measurements to provide a second corrected set of phase measurements (step 112). When the symbol phase contribution is removed from the first set of phase measurements and the second set of phase measurements, the resulting first corrected set of phase measurements and second set of corrected phase measurements, respectively, are essentially phase measurements of the signal carrier of the wireless signal. Accordingly, phase differences between the first corrected set of phase measurements and the second corrected set of phase measurements are due only to the spatial relationship between the first antenna and the second antenna, and not due to the symbol phase contribution. Finally, angle of arrival of the wireless signals is estimated based on the first corrected set of phase measurements and the second set of corrected phase measurements (step 114). Estimating the angle of arrival of the wireless signals using the first corrected set of phase measurements and second set of corrected phase measurements may be accomplished in any number of ways which will be readily appreciated by those skilled in the art, all of which are contemplated herein. While not shown, the decoded data symbols may be passed to upstream circuitry as they usually would and subsequently acted upon.

Figure 2:
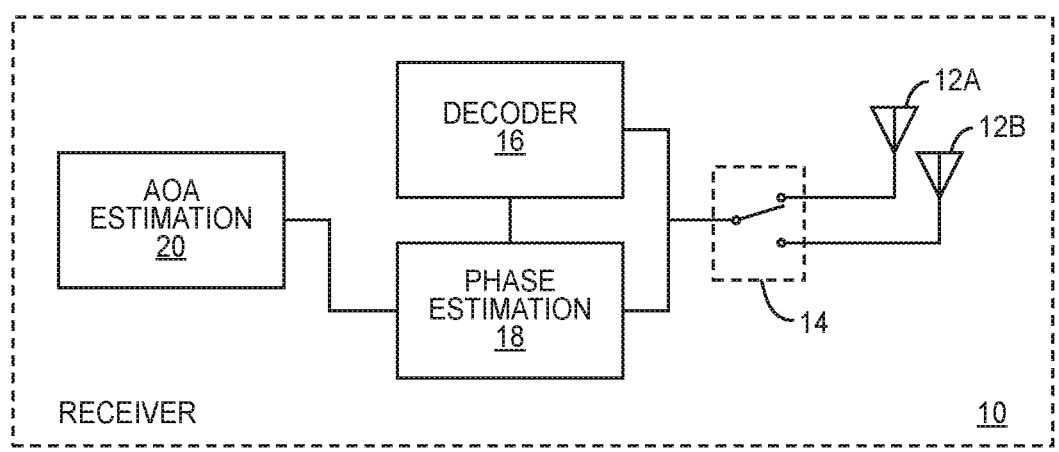
FIG. 2 is a block diagram illustrating a wireless receiver according to one embodiment of the present disclosure.

FIG. 2 shows receiver circuitry 10 for estimating angle of arrival of wireless signals according to one embodiment of the present disclosure. The receiver circuitry 10 includes a first antenna 12A, a second antenna 12B, antenna switching circuitry 14, decoder circuitry 16, phase estimation circuitry 18, and angle of arrival estimation circuitry 20. The first antenna 12A and the second antenna 12B are coupled to the decoder circuitry 16 and the phase estimation circuitry 18 via the antenna switching circuitry 14. The phase estimation circuitry 18 is further coupled between the decoder circuitry 16 and the angle of arrival estimation circuitry 20. While the decoder circuitry 16, the phase estimation circuitry 18, and the angle of arrival estimation circuitry 20 are shown as separate parts in the receiver circuitry 10, they may be combined or further separated into any number of different components without departing from the principles of the present disclosure. While not shown, the receiver circuitry 10 may further include demodulation circuitry between the antenna switching circuitry 14, the decoder circuitry 16, and the phase estimation circuitry 18.

The receiver circuitry 10 is configured to estimate the angle of arrival of the wireless signals according to the method discussed above with respect to FIG. 1. The wireless signals are received at the first antenna 12A and the second antenna 12B. To avoid duplicating the RF front-end hardware, decoder circuitry 16, the phase estimation circuitry 18, and the angle of arrival estimation circuitry 20 for each one of the antennas 12, practical low-power low-cost systems will require antenna switching circuitry 14 that switches the antenna 12 coupled to the decoder circuitry 16 and the phase estimation circuitry 18, allowing the phase of the wireless signals to be estimated by the phase estimation circuitry 18 at both the first antenna 12A and the second antenna 12B to provide the first set of phase measurements and the second set of phase measurements, respectively. Transients effects will be introduced by this antenna switching complicating phase and symbol estimation. The decoder circuitry 16 decodes the packet length and the one or more data symbols in the wireless signals, which are used by the phase estimation circuitry 18 to generate the first corrected set of phase measurements and the second corrected set of phase measurements. The angle of arrival estimation circuitry 20 uses the first corrected set of phase measurements and the second set of corrected phase measurements to estimate the angle of arrival of the wireless signals.

Figure 3:
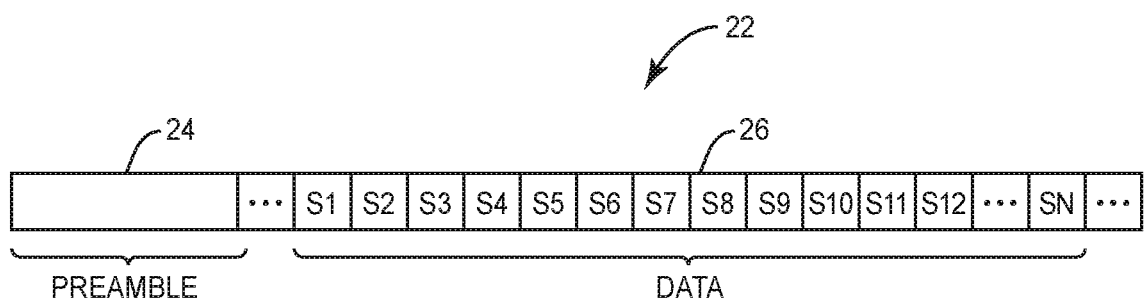
FIG. 3 is a diagram illustrating a data packet according to one embodiment of the present disclosure.

FIG. 3 illustrates an exemplary data packet 22 according to one embodiment of the present disclosure. The data packet 22 includes a preamble 24 and data 26. The data 26 includes a number of data symbols (shown as S1 to SN). The boundary of each one of the data symbols represents the symbol period for that data symbol. This is representative of the amount of time over which the data symbol is transmitted. The phase measurements discussed above are done during one or more of the data symbol periods. Depending on the format of the wireless signals carrying the data packet 22, the time over which each one of the data symbols is transmitted, or symbol period as discussed above, may be different. For example, if the wireless signals are Zigbee wireless signals, the symbol period will be significantly longer than if the wireless signals are Bluetooth Low Energy (BTLE) wireless signals. When switching between the antennas 12 of the receiver circuitry 10 to measure the phase at the first antenna 12A and the second antenna 12B as discussed above, switching transients are introduced which corrupt the signal. If the symbol period is long enough, the antenna switching circuitry 14 can switch between the first antenna 12A and the second antenna 12B at the boundaries between the symbols and there will still be enough uncorrupted signal available for the decoder circuitry 16 to reliably decode the data symbols and the phase estimation circuitry 18 to reliably estimate a phase of the incoming wireless signals. Accordingly, the angle of arrival of the wireless signals can be determined using a single data packet.

However, if the symbol period is too short (e.g., shorter than or comparable to the switching transients), the switching transients can prevent the detection of the data symbols by the decoder circuitry 16. In such a case, estimating the angle of arrival of the wireless signals may require more than a single data packet. Rather than requiring specialized transmitter circuitry that provides more than a single data packet to facilitate angle of arrival estimation, the present disclosure proposes using well known and standardized retransmission protocols for obtaining additional data packets necessary to perform angle of arrival estimation. For example, many wireless standards mandate retransmission of a packet if it is not acknowledged by a receiver. By taking advantage of such a retransmission protocol, a number of data packets necessary for angle of arrival estimation can be obtained by a receiver without any specialization of the transmitter.

Figure 4:
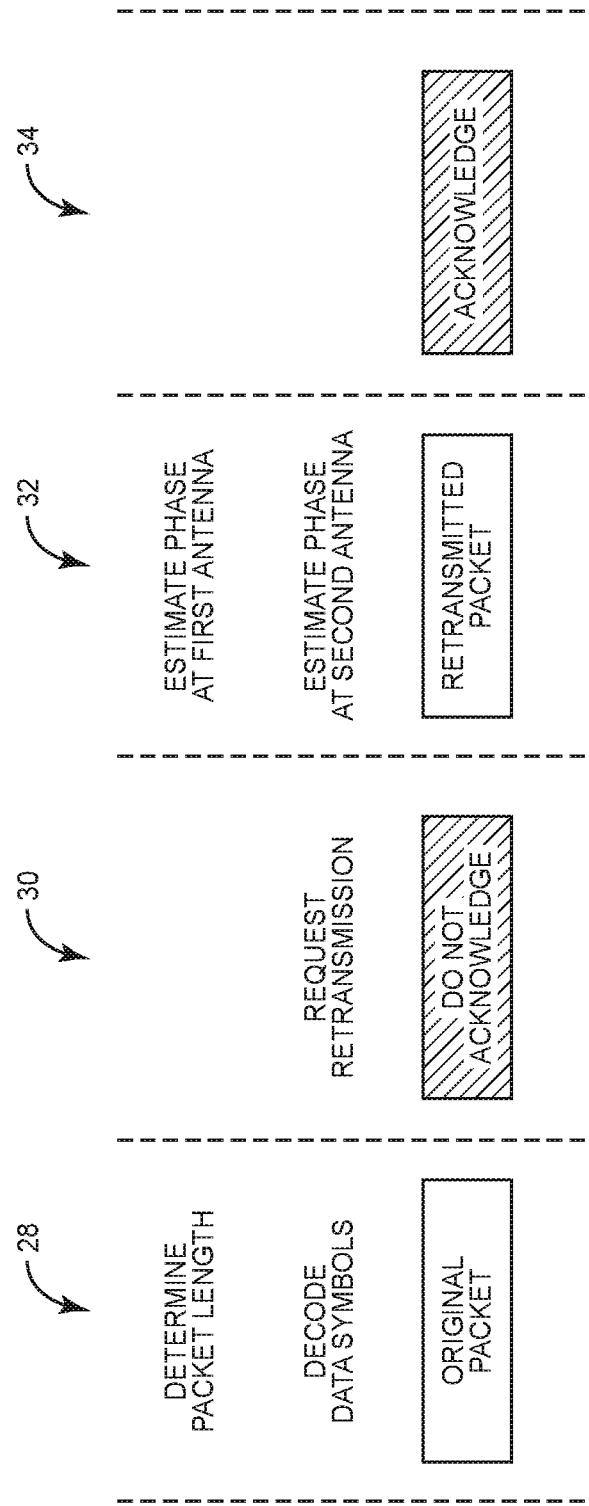
FIG. 4 is a diagram illustrating a data packet flow according to one embodiment of the present disclosure.

FIG. 4 is a diagram illustrating a data packet flow for angle of arrival estimation according to one embodiment of the present disclosure. The data packet flow starts with a first timeslot 28 in which an original data packet is transmitted. The receiver circuitry 10 may decode the original data packet to determine the packet length and the data symbols therein. Accordingly, during the first timeslot 28 the antenna switching circuitry 14 may couple a single one of the antennas 12 to the decoder circuitry 16 so that switching transients do not interfere with the decoding of the data symbols. In a second timeslot 30, the receiver circuitry 10 does not respond, thereby requesting a retransmission by means of not acknowledging receipt of the original data packet. Accordingly, in a third timeslot 32 a retransmitted data packet is transmitted. The receiver circuitry 10 may use the retransmitted data packet to estimate the phase of the wireless signals at the first antenna 12A and the second antenna 12B by switching the antenna 12 coupled to the phase estimation circuitry 18. In particular, the antenna switching circuitry 14 may switch the antenna 12 coupled to the phase estimation circuitry 18 at the boundaries of the data symbols in the retransmitted data packet such that the first set of phase measurements and the second set of phase measurements occur during the transmission of different ones of the data symbols. Switching transients may be introduced every time the antenna switches, so some number of data symbols may be ignored for the transient effects to settle before the phase estimates are made starting from an uncorrupted symbol boundary. Finally, in a fourth timeslot 34, the receiver circuitry 10 may acknowledge receipt of the retransmitted packet.

Figure 5:
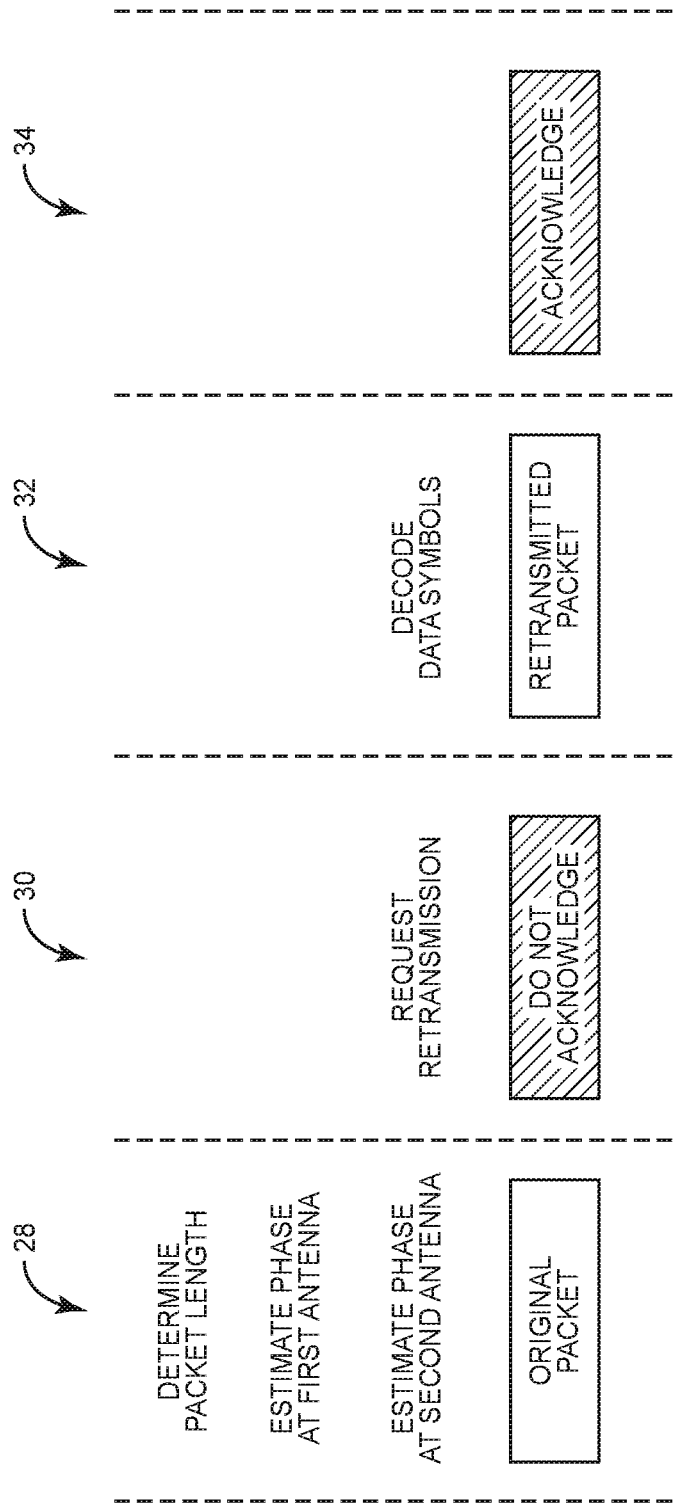
FIG. 5 is a diagram illustrating a data packet flow according to one embodiment of the present disclosure.

FIG. 5 is a diagram illustrating a data packet flow for angle of arrival estimation according to an additional embodiment of the present disclosure. The data packet flow is substantially similar to that shown in FIG. 4, except that the receiver circuitry 10 decodes a portion of the original data packet in the first timeslot 28 to determine the packet length while also estimating the phase of the wireless signals at the first antenna 12A and the second antenna 12B using the original data packet. The antenna switching circuitry 12 may thus couple one of the antennas 12 to the decoder circuitry 16 during a first part of the first timeslot 28 to accurately determine the packet length of the original data packet and then subsequently begin switching between the first antenna 12A and the second antenna 12B to estimate the phase at each of the antennas 12. The receiver circuitry 10 further decodes the data symbols from the retransmitted data packet, and thus the antenna switching circuitry 14 couples one of the antennas 12 to the decoder circuitry 16 during the third timeslot 32 and does not perform antenna switching during this time.

Figure 6:
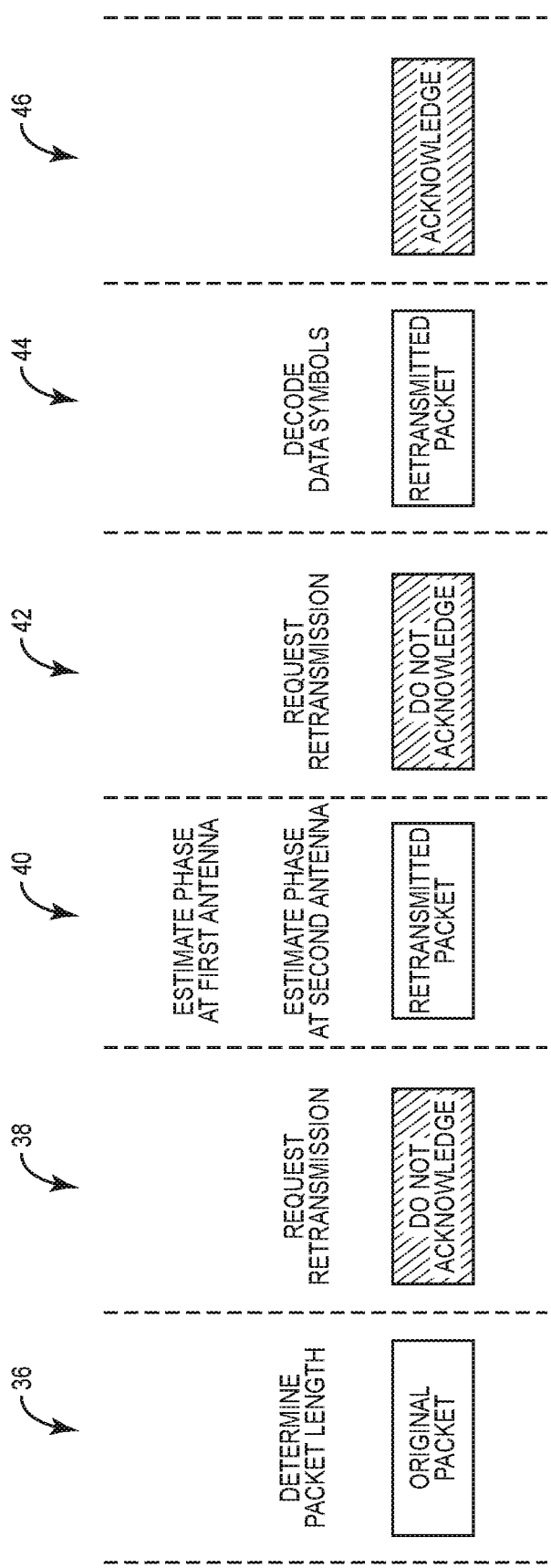
FIG. 6 is a diagram illustrating a data packet flow according to one embodiment of the present disclosure.

FIG. 6 is a diagram illustrating a data packet flow for angle of arrival estimation according to an additional embodiment of the present disclosure. The data packet flow starts with a first timeslot 36 in which an original data packet is transmitted. The receiver circuitry 10 may decode a portion of the original data packet to determine the packet length. The antenna switching circuitry 14 may couple one of the antennas 12 to the decoder circuitry 16 during the first timeslot 36 so that the packet length can be accurately determined. In a second timeslot 38, the receiver circuitry 10 does not respond, thereby requesting a retransmission by means of not acknowledging receipt of the original packet. Accordingly, in a third timeslot 40 a first retransmitted data packet is transmitted. The receiver circuitry may use the first retransmitted data packet to estimate the phase of the wireless signals at the first antenna 12A and the second antenna 12B by switching the antenna 12 coupled to the phase estimation circuitry 18 during the third timeslot 40. In particular, the antenna switching circuitry 14 may switch the antenna 12 coupled to the phase estimation circuitry 18 at the boundaries between data symbols in the first retransmitted data packet such that the first set of phase measurements and the second set of phase measurements occur during the transmission of different ones of the data symbols. In a fourth timeslot 42, the receiver circuitry 10 once again does not respond, thereby requesting a retransmission by means of not acknowledging receipt of the first retransmitted data packet. Accordingly, in a fifth timeslot 44 a second retransmitted data packet is transmitted. The receiver circuitry 10 may use the second retransmitted data packet to decode the data symbols therein. Accordingly, during the fifth timeslot 44 the antenna switching circuitry 14 may couple a single one of the antennas 12 to the decoder circuitry 16 so that switching transients do not interfere with the decoding of the data symbols in the second retransmitted data packet. Finally, in a sixth timeslot 46, the receiver circuitry 10 may acknowledge receipt of the second retransmitted data packet.

Notably, the above data packet flows are merely exemplary. Those skilled in the art will readily appreciate that the aforementioned concepts may be applied in many different ways, all of which are contemplated herein.

Figure 7:
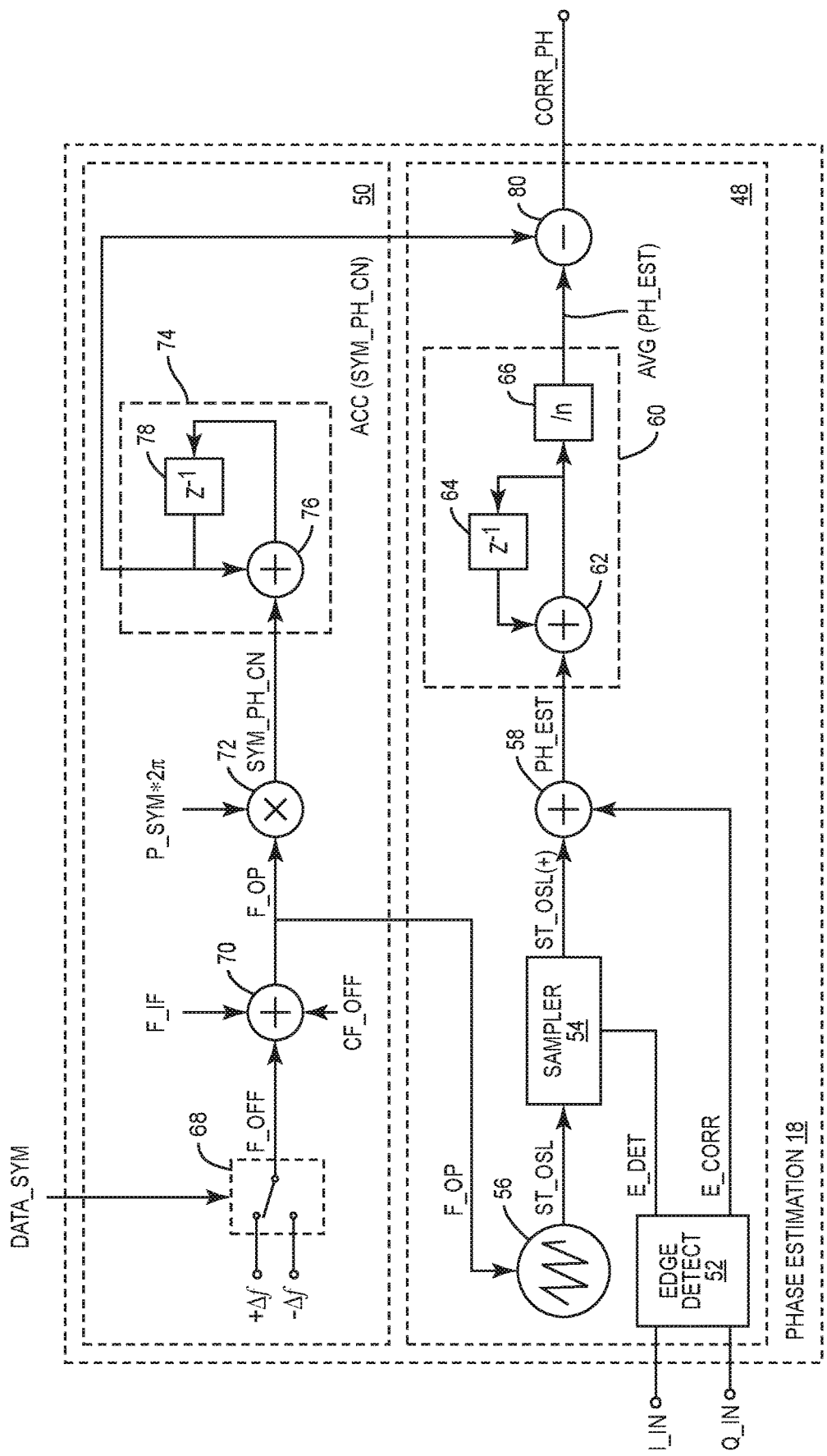
FIG. 7 is a diagram illustrating phase estimation circuitry according to on embodiment of the present disclosure.

FIG. 7 shows details of the phase estimation circuitry 18 according to one embodiment of the present disclosure. The phase estimation circuitry 18 includes phase measurement circuitry 48 and symbol phase contribution cancellation circuitry 50. The phase measurement circuitry 48 includes edge detector circuitry 52 configured to receive an in-phase component I_IN and a quadrature component Q_IN of the wireless signals (as discussed above, these may be provided by a demodulator in the receiver circuitry 10, which is not shown). Assuming that the receiver circuitry 10 is hard-limited, the in-phase component I_IN and the quadrature component Q_IN of the wireless signals are provided as binary signals such that only the edges thereof contain information. The edge detector circuitry 52 provides an edge detection signal E_DET and an edge correction signal E_CORR. The edge detection signal E_DET indicates the presence of a rising or falling edge of either the in-phase component I_IN or the quadrature component Q_IN of the wireless signals. The edge correct signal E_CORR provides an edge offset value that depends on which edge of which component is detected.

When the detected edge is a positive edge of the in-phase component I_IN of the wireless signals, the edge correction signal E_CORR is provided as +180. When the detected edge is a negative edge of the in-phase component I_IN of the wireless signals, the edge correction signal E_CORR is provided as 0. When the detected edge is a positive edge of the quadrature component Q_IN of the wireless signals, the edge correction signal E_CORR is provided as +270. When the detected edge is a negative edge of the quadrature component Q_IN of the wireless signals, the edge correction signal E_CORR is provided as +90.

The edge detection signal E_DET is provided to a sampler 54, which is triggered to sample the output of a sawtooth oscillator 56 in response thereto. The sawtooth oscillator 56 provides a sawtooth output ST_OSC that varies in amplitude from 0-360 at a frequency determined by an operating frequency signal F_OP from the symbol phase contribution cancellation circuitry 50. When triggered by the edge detection signal E_DET, the sampler 54 provides a sampled sawtooth output ST_OSC(t) to an adder 58. The adder 58 also receives the edge correction signal E_CORR from the edge detection circuitry 52, and adds the two to provide a phase estimate PH_EST. The phase estimate signal PH_EST is provided to averaging circuitry 60, which averages the phase estimate signal PH_EST with one or more previous phase estimate signals to provide an averaged phase estimate AVG(PH_EST). The averaging circuitry 60 includes an averaging adder 62, a delay 64, and a divider 66. The phase estimate signal PH_EST is provided to the adder 62, where it is added to one or more previous phase estimates held in the delay 64. The combined phase estimates are provided to the divider 66 where they are divided by the number of phase estimates to provide the averaged phase estimate AVG(PH_EST). Further details regarding the phase measurement circuitry 48 can be found in co-assigned and co-pending U.S. patent application Ser. No. 16/175,184, filed on Oct. 30, 2018, now U.S. Pat. No. 10,581,421, the contents of which are hereby incorporated by reference in their entirety.

The symbol phase contribution cancellation circuitry 50 includes frequency selector circuitry 68, which receives a positive frequency offset signal +Δf, a negative frequency offset signal −Δf, and a data symbol DATA_SYM and provides one of the positive frequency offset signal +Δf and the negative frequency offset signal −Δf as a frequency offset value F_OFF. Which one of the positive frequency offset signal +Δf and the negative frequency offset signal −Δf depends on the data symbol DATA_SYM. Those skilled in the art will appreciate that in continuous phase frequency shift keying (CPFSK) systems, the frequency is modulated by ±Δf to convey different data symbols. For example, in BTLE systems, the frequency is modulated by ±250 kHz, and for Zigbee systems the frequency is modulated by ±500 kHz. The frequency offset value F_OFF thus is indicative of the data symbol DATA_SYM.

The frequency offset value F_OFF is added to a known intermediate frequency F_IF of the wireless signals and an estimated carrier frequency offset CF_OFF of the wireless signals by an adder 70 to provide an operating frequency signal F_OP. The carrier frequency offset CF_OFF may be determined, for example, when decoding the preamble of one of the data packets. The operating frequency signal F_OP is provided to the phase estimation circuitry 50 and a multiplier 72, where it is multiplied by a symbol period P_SYM*2π to provide a symbol phase contribution SYM_PH_CN, which, as discussed above is the phase of the signal carrier due to modulation of the current data symbol DATA_SYM. The symbol phase contribution SYM_PH_CN is accumulated with previously determined symbol phase contributions for preceding symbols in the data packet to provide an accumulated symbol phase contribution ACC (SYM_PH_CN). This is because in CPFSK systems, the symbol phase contribution of each data symbol is influenced by the symbol phase contribution of the data symbols that preceded it. The accumulator 74 includes an adder 76 and a delay 78. The symbol phase contribution SYM_PH_CN is provided to the adder 76, where it is added to one or more previous symbol phase contributions held in the delay 78.

The accumulated symbol phase contribution ACC (SYM_PH_CN) is provided to a subtractor 80 in the phase measurement circuitry 48, where it is subtracted from the averaged phase estimate AVG(PH_EST) to provide a corrected phase CORR_PH. As discussed above, the corrected phase is indicative of the phase of the carrier signal only, without the influence of the symbol phase contribution. Notably, while the phase measurement circuitry 48 may not measure the phase of the wireless signals during every data symbol of a packet, the symbol phase contribution cancellation circuitry 50 nevertheless accumulates a symbol phase contribution for each symbol in the packet, since, as discussed above, the symbol phase contribution of each data symbol may be dependent on the symbol phase contribution of every preceding data symbol.

Figure 8:
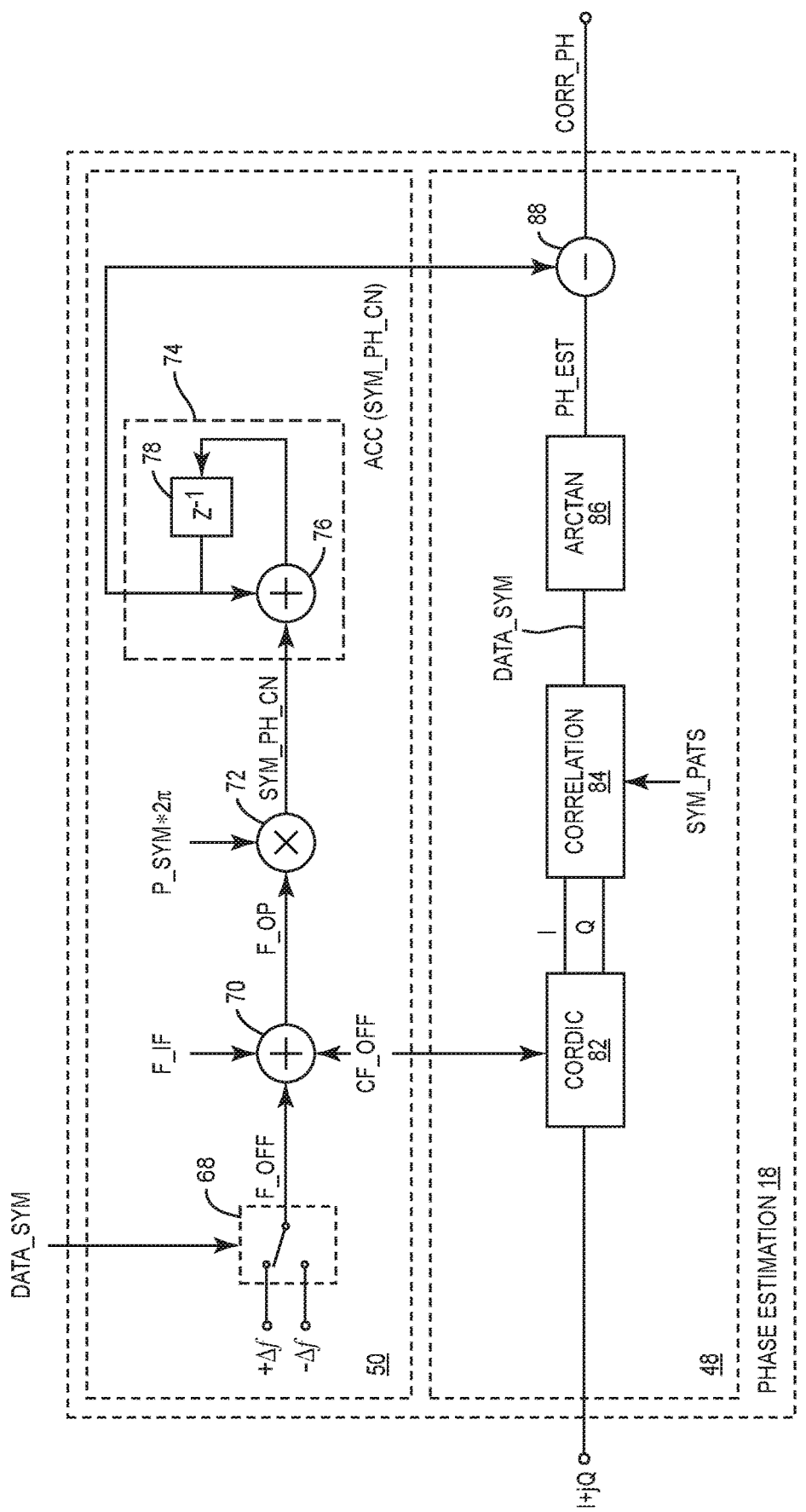
FIG. 8 is a diagram illustrating phase estimation circuitry according to one embodiment of the present disclosure.

FIG. 8 shows details of the phase estimation circuitry 18 according to an additional embodiment of the present disclosure. Once again, the phase estimation circuitry 18 includes the phase measurement circuitry 48 and the symbol phase contribution cancellation circuitry 50. While the symbol phase contribution cancellation circuitry 50 is the same as in FIG. 7, the phase measurement circuitry 48 instead includes a CORDIC 82, correlation circuitry 84, ARCTAN circuitry 86, and a subtractor 88. The CORDIC 82 receives the wireless signals and breaks them into an in-phase component I and a quadrature component Q. The correlation circuitry 84 correlates the in-phase component I and the quadrature component Q with a number of known symbol patterns SYM_PATS to detect a data symbol DATA_SYM. The ARCTAN circuitry 86 converts the data symbol into a phase estimate PH_EST. The subtractor circuitry 88 subtracts the accumulated symbol phase contribution ACC (SYM_PH_CN) from the symbol phase contribution cancellation circuitry 50 to provide a corrected phase CORR_PH. As discussed above, the corrected phase is indicative of the phase of the carrier signal only, without the influence of the symbol phase contribution.

In some situations, it may still be desirable to transmit a specific data packet for purposes of angle of arrival estimation. However, this packet may still be compatible with the wireless standards employed by a transmitter while providing improved accuracy and performance for angle of arrival estimation. First, a known sequence of data symbols may be transmitted. By transmitting a known sequence of data symbols, the overhead associated with detecting symbol phase contribution is foregone. Further, doing so may provide improved performance by allowing for the selection of a desirable symbol sequence and packet length that improves the accuracy of angle of arrival estimation. Accordingly, FIG. 9 shows a data packet 90 for angle of arrival estimation according to one embodiment of the present disclosure. The data packet 90 includes a preamble, a start frame delimiter (SFD), a header, some known data, a number of repeated data symbols, and a cyclic redundancy check (CRC). The known data includes a number of random or known data symbols for improving initial time and frequency estimates. The repeated symbols include a long sequence of data symbols, which make it easier for a receiver to estimate angle of arrival. During the preamble and SFD, the receiver circuitry 10 may sync to the data packet using well-known systems and methods for doing so. During the header and known data, the receiver circuitry 10 may perform frequency tracking using well-known systems and methods to estimate frequency and timing offsets. The known data may improve the reliability of the frequency and timing offsets, since the length thereof can be significantly longer than may be available for frequency tracking in an arbitrary data packet. Finally, the receiver circuitry 10 may estimate the phase of the wireless signals during the repeated symbol. Since the repeated symbol is known beforehand and the number of repeated symbols can be controlled, the accuracy of phase estimation and thus angle of arrival estimation may be improved over the use of an arbitrary data packet. Further, the data symbol used for the repeated symbol may be chosen to make phase estimation easier by choosing a data symbol with a long sequence of 1 or 0 chips.

Figure 10:
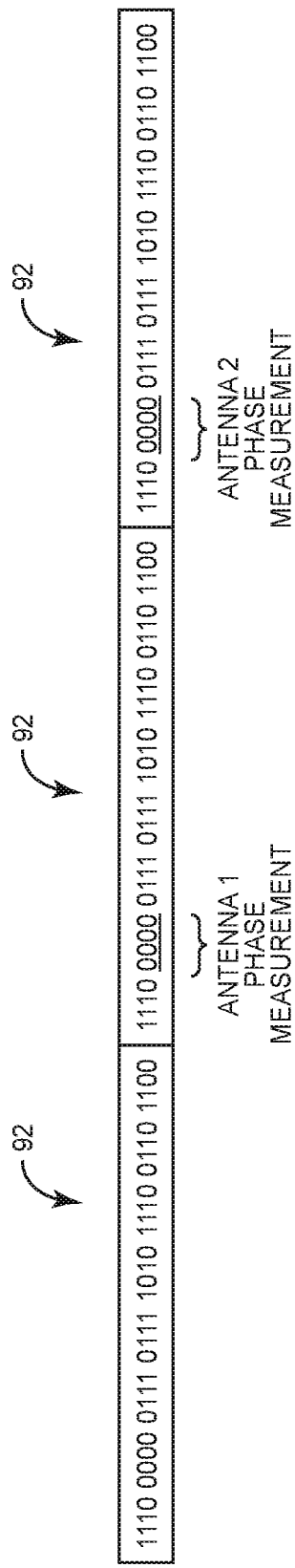
FIG. 10 is a diagram illustrating a series of repeating data symbols for use in angle of arrival estimation according to one embodiment of the present disclosure.

Those skilled in the art will appreciate that in a minimum-shift keying (MSK) modulation scheme, each data symbol is made up of a number of chips, which are represented as 1 or 0, as shown in FIG. 10, which illustrates an MSK data symbol 92 repeating three times. As shown, each data symbol contains a string of six continuous 0 chips. Choosing such a symbol and measuring phase as discussed below may provide accuracy improvements to the phase measurements performed by a receiver and thus the resulting angle of arrival estimation. First, switching the antennas 12 once per symbol at the same position in the symbol may reduce the effects of inter-symbol interference (ISI) on the phase estimates, since the ISI contribution will be the same on each antenna when performed in this way. Next, by switching the antennas several microseconds before the phase measurement period shown, the influence of switching transients on the phase measurements can be avoided. Finally, by performing the phase measurements during a long sequence of 1 or 0 chips (0 chips in the example shown in FIG. 10), the phase estimate is more robust to timing synchronization errors. A fixed timing error will not impact the accuracy of angle of arrival estimation so long as the phase measurement period remains within the sequence of 1 or 0 chips. Notably, this last measuring technique may be applied regardless of whether the data symbols are known ahead of time. That is, the data symbol may be detected if not known ahead of time and the phase estimates may still be performed at a preferred place within the symbol where the likelihood of accuracy is higher (e.g., during a long string of 1 or 0 chips as discussed above).

Those skilled in the art will recognize improvements and modifications to the preferred embodiments of the present disclosure. All such improvements and modifications are considered within the scope of the concepts disclosed herein and the claims that follow.

What is claimed is:

1. A method for operating a wireless receiver comprising:
receiving wireless signals from a transmitter at a first antenna and a second antenna, the wireless signals comprising a signal carrier and one or more data symbols modulated onto the signal carrier, wherein each of the one or more data symbols is modulated onto the signal carrier during a different symbol period;
decoding the one or more data symbols in a first portion of the wireless signals to determine a symbol phase contribution, wherein the symbol phase contribution is a change in the phase of the signal carrier due to modulation of the one or more data symbols;
estimating a phase of the wireless signals received at the first antenna within a second portion of the wireless signals including one or more symbol periods to provide a first set of phase measurements, wherein the second portion of the wireless signals is noncontiguous with the first portion of the wireless signals;
estimating a phase of the wireless signals received at the second antenna within the second portion of the wireless signals at one or more symbol periods to provide a second set of phase measurements;
removing the symbol phase contribution from the first set of phase measurements to provide a first corrected set of phase measurements;
removing the symbol phase contribution from the second set of phase measurements to provide a second corrected set of phase measurements; and
analyzing the first corrected set of phase measurements and the second corrected set of phase measurements to estimate an angle of arrival of the wireless signals.

2. The method of claim 1 wherein:
decoding the one or more data symbols comprises decoding the one or more data symbols in the first portion of the wireless signals;
estimating the phase of the wireless signals received at the first antenna comprises estimating the phase of the wireless signals received at the first antenna within the first portion of the wireless signals; and
estimating the phase of the wireless signals received at the second antenna comprises estimating the phase of the wireless signals received at the second antenna within the first portion of the wireless signals.

3. The method of claim 1 wherein:
the one or more data symbols are part of a data packet; and
the method further comprises requesting retransmission of the data packet from the transmitter such that the wireless signals include an original data packet and one or more retransmitted data packets.

4. The method of claim 3 wherein:
the first portion of the wireless signals includes the one or more data symbols in a first one of the original data packet and the one or more retransmitted data packets; and
the second portion of the wireless signals includes the one or more data symbols in a second one of the original data packet and the one or more retransmitted data packets, which is different from the first one of the original data packet and the one or more retransmitted data packets.

5. The method of claim 4 further comprising decoding the first portion of the wireless signals to determine a length of the data packet including the one or more data symbols.

6. The method of claim 4 further comprising decoding the second portion of the wireless signals to determine a length of the data packet including the one or more data symbols.

7. The method of claim 4 further comprising decoding a third portion of the wireless signals to determine a length of the data packet including the one or more data symbols, wherein:
the third portion of the wireless signals is noncontiguous with the first portion of the wireless signals and the second portion of the wireless signals; and
the third portion of the wireless signals includes the one or more data symbols in a third one of the original data packet and the one or more retransmitted data packets, which is different from the first one of the original data packet and the one or more retransmitted data packets and the second one of the original data packet and the one or more retransmitted data packets.

* * * * *